United States Patent
Kurematsu et al.

(10) Patent No.: US 11,285,854 B2
(45) Date of Patent: Mar. 29, 2022

(54) AIR BAG AND SEAT APPARATUS FOR VEHICLE

(71) Applicant: AISIN CORPORATION, Kariya (JP)

(72) Inventors: Yasuhito Kurematsu, Kariya (JP); Ryosuke Mizuno, Kariya (JP); Satoshi Masuda, Kariya (JP); Takahiro Jomen, Kariya (JP); Makoto Sueyoshi, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 17/021,016

(22) Filed: Sep. 15, 2020

(65) Prior Publication Data

US 2021/0078475 A1 Mar. 18, 2021

(30) Foreign Application Priority Data

Sep. 17, 2019 (JP) .............................. JP2019-168639

(51) Int. Cl.
*B60N 2/90* (2018.01)
*A47C 7/14* (2006.01)
*A47C 7/46* (2006.01)

(52) U.S. Cl.
CPC .............. *B60N 2/914* (2018.02); *A47C 7/142* (2018.08); *A47C 7/467* (2013.01); *B60N 2/976* (2018.02)

(58) Field of Classification Search
CPC ........... A47C 7/142; A47C 7/14; A47C 7/467; A47C 7/46; B60N 2/914; B60N 2/976; B60N 2/665
USPC ..................................................... 297/284.6
See application file for complete search history.

(56) References Cited

U.S. PATENT DOCUMENTS

| | | | |
|---|---|---|---|
| 7,931,334 B1* | 4/2011 | Caruso | A47C 31/126 297/217.3 |
| 8,641,142 B2 | 2/2014 | Griffin et al. | |
| 9,949,568 B2 | 4/2018 | Zouzal et al. | |
| 2002/0047297 A1* | 4/2002 | Longhi | B60N 2/646 297/284.1 |
| 2006/0049678 A1 | 3/2006 | Kern et al. | |
| 2006/0138832 A1* | 6/2006 | Ogura | B60N 2/66 297/284.4 |
| 2008/0277985 A1* | 11/2008 | Petzel | B60N 2/914 297/284.6 |
| 2009/0152916 A1* | 6/2009 | Lin | A61G 5/006 297/217.3 |
| 2010/0117411 A1* | 5/2010 | Fujita | A61B 5/0816 297/217.1 |
| 2018/0257534 A1* | 9/2018 | Mizoi | B60N 2/99 |

FOREIGN PATENT DOCUMENTS

JP 4305663 B2 7/2009
JP 2015-096403 A 5/2015

* cited by examiner

*Primary Examiner* — Mark R Wendell
(74) *Attorney, Agent, or Firm* — Oblon, McClelland, Maier & Neustadt, L.L.P.

(57) ABSTRACT

An airbag includes a bag portion including two sheet members which are attached to each other. The bag portion provided with the sheet members which are attached to each other includes a peripheral rim portion having a plurality of bent side portions, the bent side portions which each is bent by filling with air inside the bag portion, the bent side portions, the bent side portions which each is formed with a groove-shaped constriction at a surface of the bag portion which is configured to inflate by filling with air.

11 Claims, 7 Drawing Sheets

AIR BAG AND SEAT APPARATUS FOR VEHICLE

CROSS REFERENCE TO RELATED APPLICATIONS

This application is based on and claims priority under 35 U.S.C. § 119 to Japanese Patent Application 2019-168639, filed on Sep. 17, 2019, the entire content of which is incorporated herein by reference.

TECHNICAL FIELD

This disclosure generally relates to an air bag and a seat apparatus for a vehicle.

BACKGROUND DISCUSSION

A known seat apparatus for a vehicle which is configured to offer a passenger seated on a seat his/her desired refreshment effect by an airbag provided inside a seat surface, the airbag which inflates or expands and deflates or contracts is disclosed in JP4305663B (hereinafter referred to as Patent reference 1). The airbag used in the vehicle disclosed in Patent reference 1 includes a bag portion disclosed in JP2015-96403A (hereinafter referred to as Patent reference 2), the bag portion which is provided with two sheet members attached to each other. Such airbag may simplify the configuration thereof.

However, the airbag disclosed in Patent reference 2 is configured such that, in a case where the bag portion inflates by filling with air inside the bag portion, stress may be intensively applied at a peripheral rim portion of the sheet members configuring the bag portion, the peripheral rim portion at which the sheet materials are attached to each other. Furthermore, the sheets may not always be uniformly or evenly attached to each other over the whole periphery of the bag portion. As the peripheral rim portion of the bag portion is intensively applied with stress, the durability performance may be decreased.

A need thus exists for an airbag and a seat apparatus for a vehicle which is not susceptible to the drawback mentioned above.

SUMMARY

According to an aspect of this disclosure, an airbag includes a bag portion including two sheet members which are attached to each other. The bag portion provided with the sheet members which are attached to each other includes a peripheral rim portion having a plurality of bent side portions, the bent side portions which each is bent by filling with air inside the bag portion, the bent side portions, the bent side portions which each is formed with a groove-shaped constriction at a surface of the bag portion which is configured to inflate by filling with air.

According to another aspect of this disclosure, a seat apparatus for a vehicle, the seat apparatus includes an airbag including a bag portion having two sheet members which are attached to each other. The bag portion provided with the sheet members which are attached to each other includes a peripheral rim portion having a plurality of bent side portions, the bent side portions which each is bent by filling with air inside the bag portion, the bent side portions, the bent side portions which each is formed with a groove-shaped constriction at a surface of the bag portion which is configured to inflate by filling with air. The airbag is arranged inside a seat surface.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
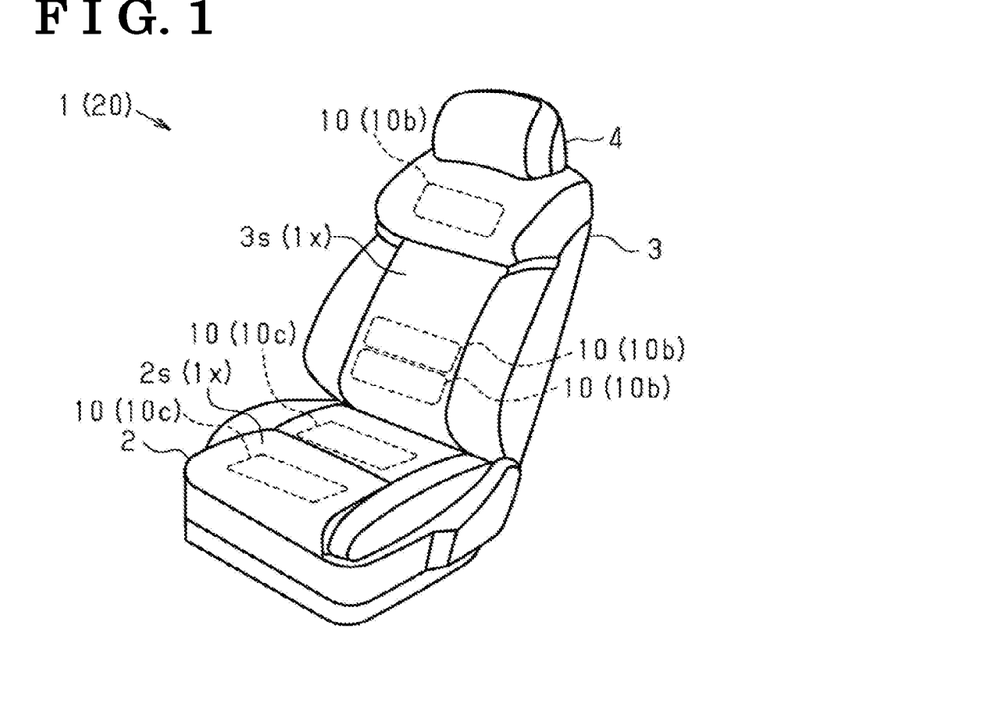
FIG. 1 is a perspective view of a vehicle seat including airbags inside a seat surface according to an embodiment disclosed here.

As shown in FIG. 1, a seat 1 for a vehicle includes a seat cushion 2, and a seatback 3 provided at a rear end portion of the seat cushion 2. A headrest 4 is provided at an upper end of the seatback 3.

The seat 1 of the embodiment includes plural airbags 10 pressing a seat surface 1x from inside, the seat surface 1x configuring a seat surface 2s and a seatback surface 3s, by inflating or expanding and deflating or contracting within the seat cushion 2 and the seatback 3. Specifically, the seat cushion 2 includes the dedicated airbags 10 for the seat support at positions supporting a hip and thighs of a passenger seated on the seat 1. The seatback 3 also includes the dedicated airbags 10 at positions supporting a shoulder and a lower back of the passenger lean on the seatback surface 3s. In the embodiment, a seat apparatus 20 may offer refreshment effect to a passenger seated on the seat 1.

Figure 2:
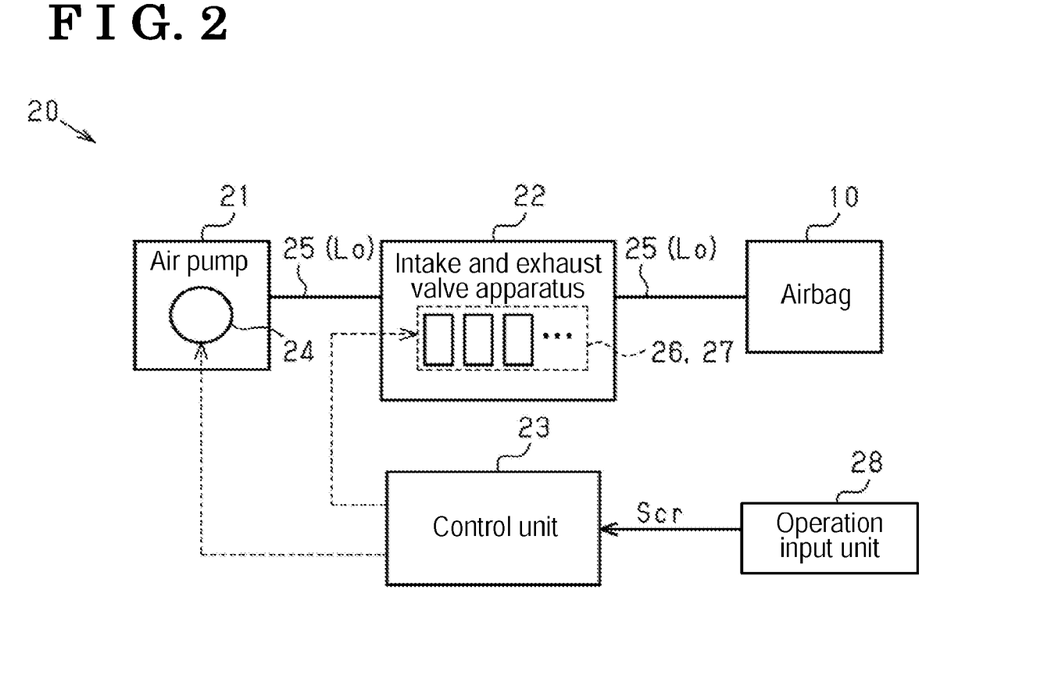
FIG. 2 is a schematic view illustrating a seat apparatus.

Specifically, as shown in FIG. 2, the seat apparatus 20 of the embodiment includes an air pump 21 pumping air to the airbags 10. Furthermore, an intake and exhaust valve apparatus 22 is provided between the air pump 21 and the airbags 10. A control unit 23 of the seat apparatus 20 of the embodiment controls the operation of the air pump 21 and the intake and exhaust valve apparatus 22.

Specifically, the air pump 21 of the embodiment is an electric pump including or using a motor 24 as a drive source. The intake and exhaust valve apparatus 22 is connected to the airbags 10 and the air pump 21 via air tubes 25 which each is made of resin having flexibility. That is, in the seat apparatus 20 of the embodiment, air paths (intake and exhaust flow paths Lo) communicating the airbags 10 and the air pump 21 are provided by the air tubes 25 and an inner path of the intake and exhaust valve apparatus 22. An intake valve 26 and an exhaust valve 27 of the intake and exhaust valve apparatus 22 of the embodiment are arranged at some positions of the intake and exhaust flow paths Lo.

An operation input signal Scr relative to an operation input unit 28 provided at the seat 1 is inputted to the control unit 23 of the embodiment. The control unit 23 of the embodiment controls the operation of the air pump 21 and the intake and exhaust valve apparatus 22 so as to inflate and deflate the airbags 10 based on operation request indicated by the operation input signal Scr.

Specifically, the control unit 23 of the embodiment intermittently controls the airbags 10 to be inflated and deflated by switching the airbags 10 to be inflated based on a predetermined movement of the passenger, the movement supporting the operation input signal Scr inputted from the operation input unit 28. According to the seat apparatus 20 of the embodiment, the passenger seated on the seat 1 may obtain desired refreshment effect.

The airbags 10 for refreshment of the seat apparatus 20 of the embodiment will hereunder be explained.

Figure 3A:
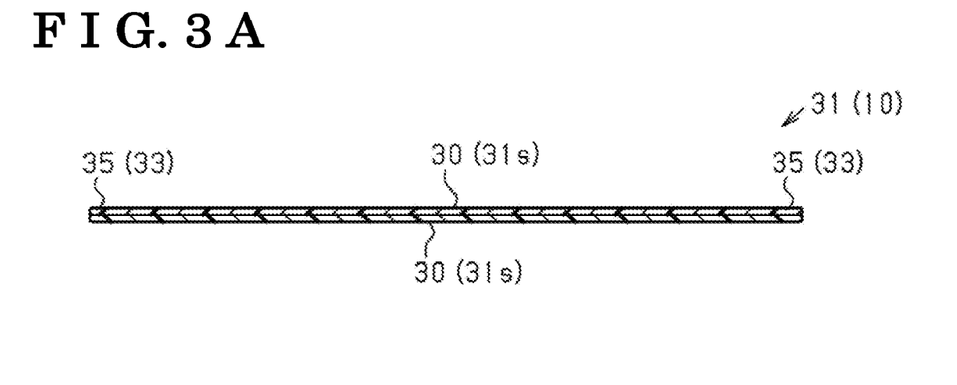
FIG. 3A is a cross sectional view of the airbag.
Figure 3B:
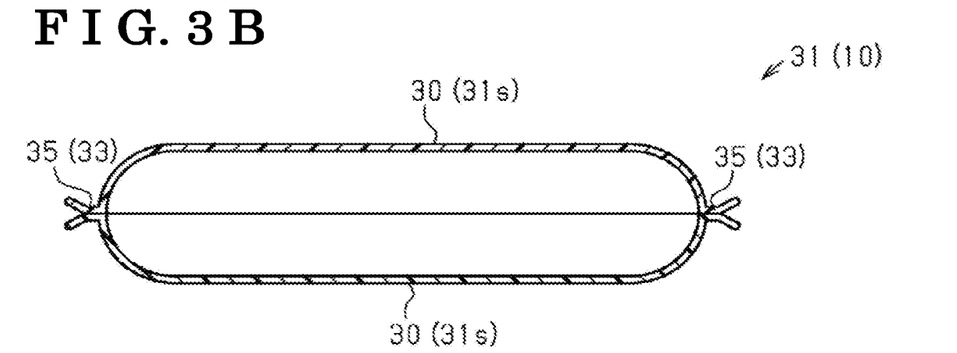
FIG. 3B is another cross sectional view of the airbag.

As shown in FIGS. 3A and 3B, the airbag 10 of the seat apparatus 20 of the embodiment includes a bag portion 31 having two sheet members 30, 30 which are attached to each other. That is, the airbags 10 of the embodiment is formed such that air fills in two sheet members 30, 30 including peripheral rim portions attached to each other, and the bag portion 31 inflates. The bag portion 31 which inflates presses a seat surface 1x from inside of the bag portion 31.

Figure 4:
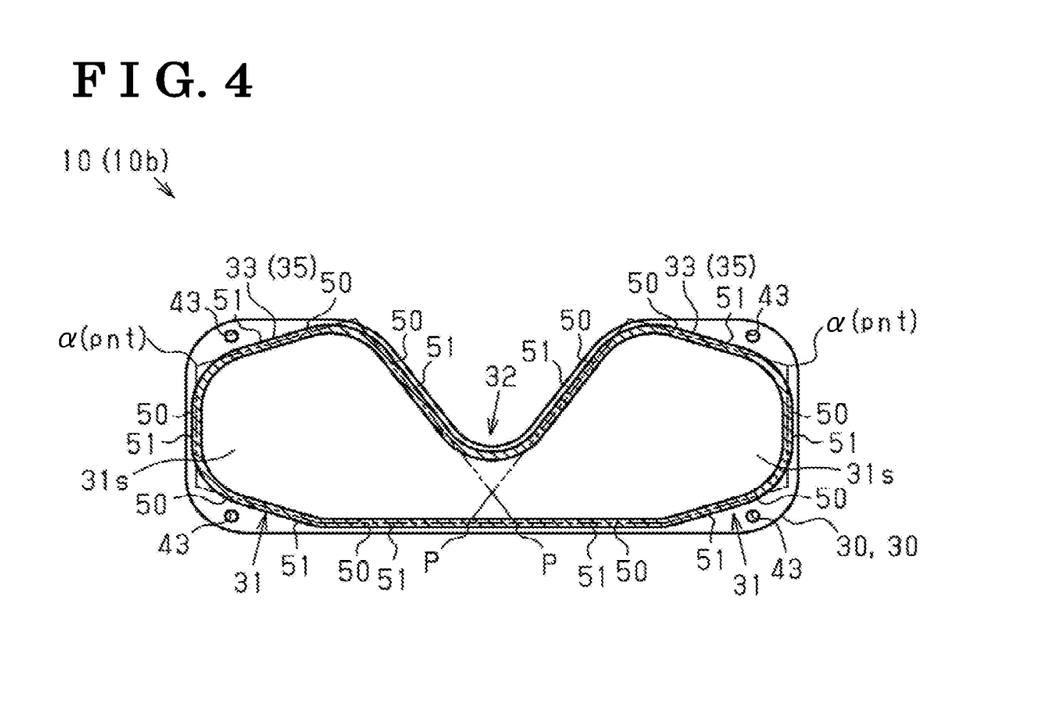
FIG. 4 is a plan view of the airbag.
Figure 5:
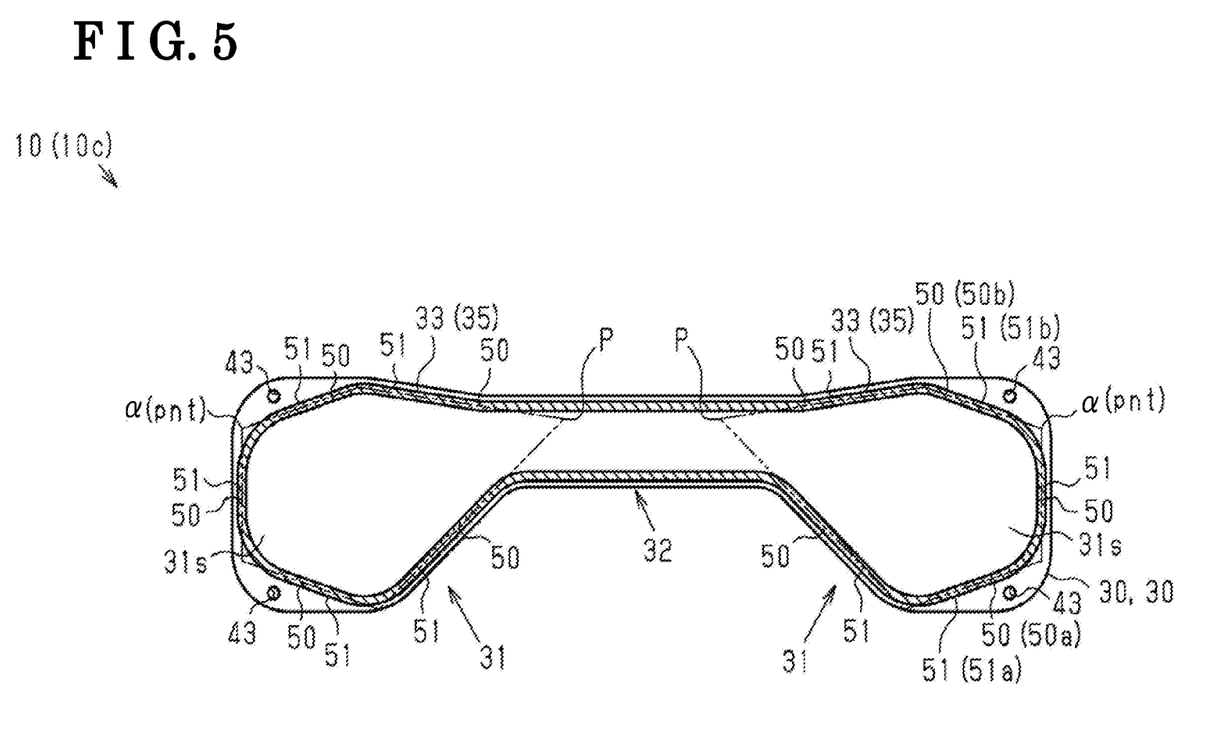
FIG. 5 is another cross sectional view of the airbag.

In particular, as shown in FIGS. 4 and 5, the airbags 10 of the embodiment include right-left pair of bag portions 31, 31 arranged to be spaced apart from each other in a seat width direction, and a connection part 32 communicating the bag portions 31, 31.

More specifically, the airbag 10 of the embodiment is formed such that the two seat members 30, 30, which are shaped by die cutting to match the shapes of the bag portions 31, 31 and of the connection part 32, are overlapped with each other in the thickness direction thereof, and peripheral rim portions of the sheet members 30, 30 are welded to be attached to each other. The sheet members 30, 30 each is made from a flexible resin material. The sheet members 30, 30 are welded by, for example, high-frequency welding. In each of FIGS. 4 and 5, a hatching pattern shows a welded portion 35 forming a peripheral rim portion 33 of the bag portion 31 by attaching the sheet members 30, 30.

The seat apparatus 20 of the embodiment is configured such that the length of the connection part 32 extending in the seat width direction of airbags 10c of the seat cushion 2 (see FIG. 5) is longer than the length of airbags 10b of the seatback 3 (see FIG. 4). The bag portions 31, 31 of the airbags 10c of the seat apparatus 20 of the embodiment are configured to contact with legs of a passenger to appropriately press a hip or thighs of the passenger seated on the seat 1.

Figure 6:
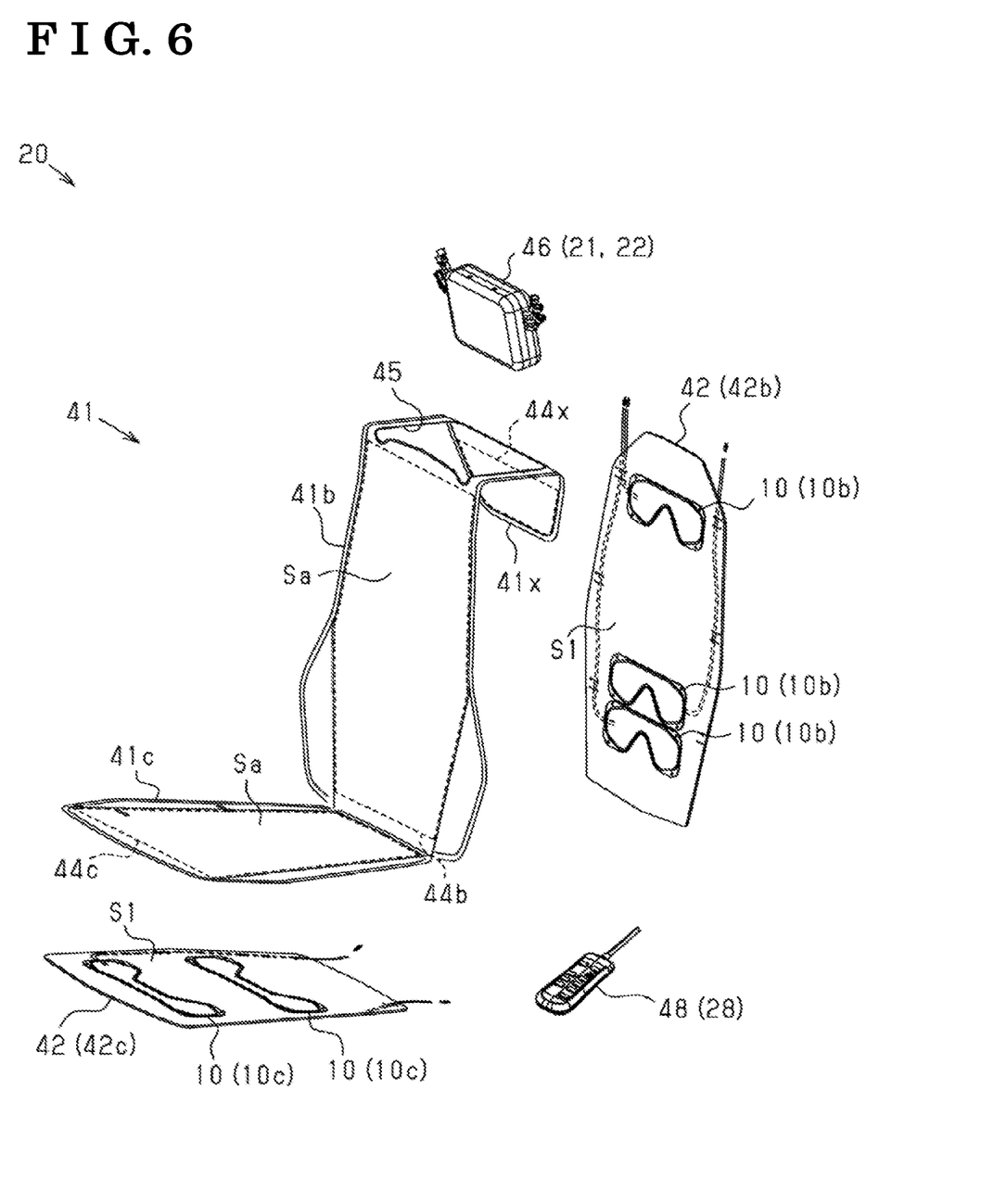
FIG. 6 is an exploded perspective view of the seat apparatus.
Figure 7:
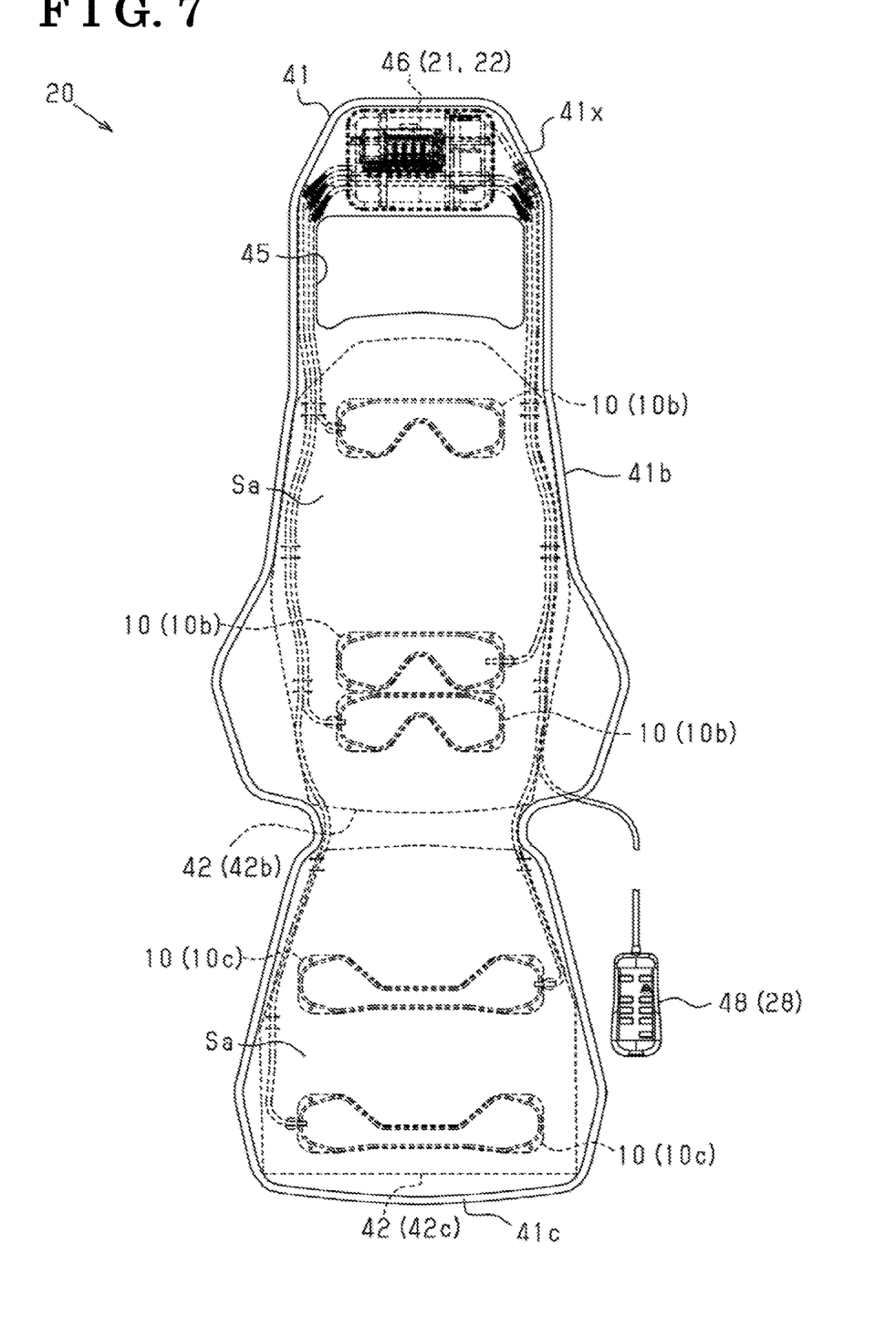
FIG. 7 is an expansion view of the seat apparatus.

More specifically, as shown in FIGS. 6 and 7, the seat apparatus 20 of the embodiment includes a surface assembly 41 and a base member 42. The surface assembly 41 configures the seat surface 1x. The base member 42 is attached to the surface assembly 41 in a state of including the airbags 10.

In particular, the surface assembly 41 of the embodiment includes the configuration in which a surface part 41b of the seatback 3 and a surface part 41c of the seat cushion 2 are integrally formed. The base member 42 of the embodiment includes the configuration in which a base member 42b of the seatback 3 and a base member 42c of the seat cushion 2 are separated from each other. The base member 42b, 42c of the seat apparatus 20 of the embodiment each is formed in a substantially flat plate shape. The seat apparatus 20 of the embodiment is configured such that the airbag 10b of the seatback 3 and the airbag 10c of the seat cushion 2 are retained or held by the base members 42b, 42c in a state of being attached to first surfaces S1, respectively.

As shown in FIGS. 4 and 5, the airbag 10 of the embodiment includes plural hole portions 43 provided to penetrate the two sheet members 30, 30 of the airbags 10, the hole portions 43 arranged outward relative to the peripheral rim portion 33 of the bag portions 31, 31. The hole portions 43 of the seat apparatus 20 of the embodiment fix the airbags 10b, 10c to the first surfaces S1 of the base members 42b, 42c, respectively.

As shown in FIGS. 6 and 7, the surface assembly 41 of the embodiment includes pocket portions 44b, 44c provided at the surface portion 41b of the seatback 3 and the surface portion 41c of the seat cushion 2, respectively. The base members 42b, 43b of the embodiment are inserted into the pocket portions 44b, 44c, respectively, in a state where the first surfaces S1 holding the airbags 10b, 10c face the same direction of the surfaces Sa of the surface portions 41b. 41c. The seat apparatus 20 of the embodiment is configured such that the airbags 10b, 10c arranged inside the seat surfaces 1x inflate and deflate in a state of being supported by the base members 42b, 42c, respectively.

The surface assembly 41 of the embodiment includes a through hole 45 and a surface portion 41x. The through hole 45 is inserted by the head rest 4 of the seat 1. The surface portion 41x is folded back toward a back surface of the seatback 3 from a position where the through hole 45 is provided. The surface assembly 41 also includes a pocket portion 44x at the surface portion 41x arranged at the back surface of the seat back 3. The seat apparatus 20 of the embodiment holds an actuator assembly 46 inside the pocket portion 44x, the actuator assembly 46 which corresponds to an unit in which the air pump 21 and the intake and exhaust valve apparatus 22 (see FIG. 2) are integrally provided.

The seat apparatus 20 of the embodiment includes a controller 48 serving as the operation input unit 28 which is separately or dedicatedly provided from the actuator assembly 46. The passenger of the seat 1 operates the controller 48 to obtain the desired refreshment effect by inflating and deflating the airbags 10b, 10c arranged inside the seat surfaces 1x.

In particular, as shown in FIGS. 4 and 5, the bag portions 31, 31 of the sheet members 30, 30 configuring the airbags 10 of the embodiment each includes a peripheral shape α which is right-left symmetric when seen in the thickness direction of the sheet member 30. In particular, the peripheral shape α of the bag portion 31 includes a pentagon shape pnt. The airbag 10 of the embodiment is configured such that the connection portion 32 communicates the bag portions 31, 31 which are apart from each other in the right-left direction at points P which face each other, the bag portions 31, 31 each including the pentagon shape pnt.

In the airbags 10 of the embodiment, a bent side portion 51 bent as the bag portions 31, 31 is each filled with air corresponds to a part forming a side 50 of the pentagon shape pnt, the part of the peripheral rim portion 33 including the weld portion 35 of the sheet member 30.

Figure 8A:
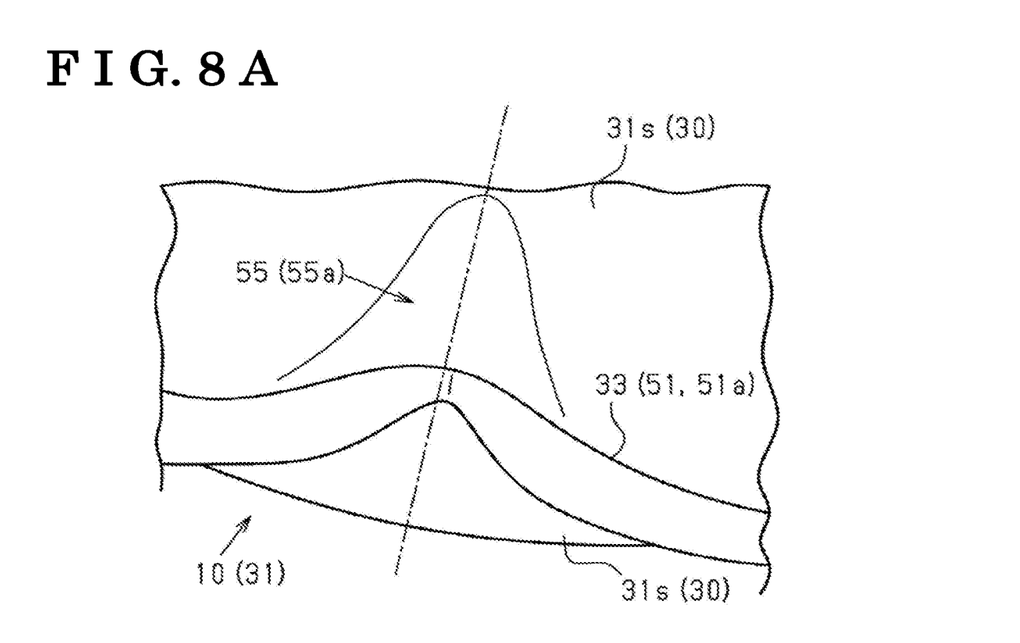
FIG. 8A is an explanation view of a constriction provided on a surface of a bent side portion of a bag portion.
Figure 8B:
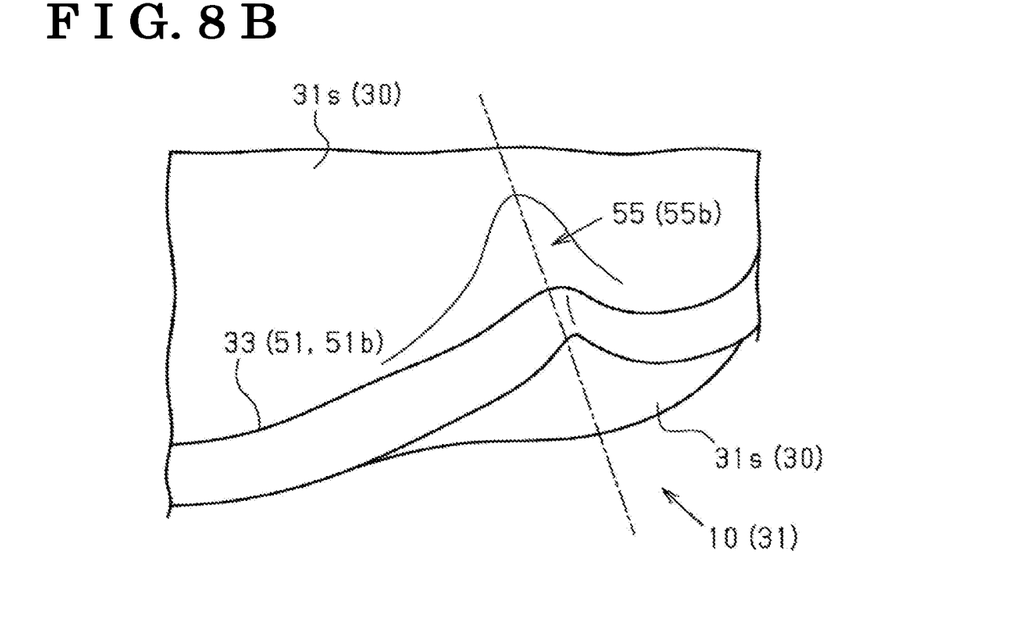
FIG. 8B is another explanation view of the constriction provided on the surface of the bent side portion of the bag portion.

More specifically, as shown in FIGS. 8A and 8B, the bent side portions 51 each is bent in a dog-legged shape based on or in response to force of air filled in each of the bag portions 31, 31, the force expanding the bag portions 31, 31. Accordingly, a surface 31s of each of the bag portion 31, 31 inflated or expanded includes a constriction 55 which is formed in a groove shape and which extends in a direction orthogonal to the side 50 of the pentagon shape pnt. To facilitate the explanation, FIG. 8A illustrates a first constriction 55a arranged at a first bent side portion 51a corresponding to a first side 50a of the pentagon shape pnt arranged at the bag portion 31. FIG. 8B illustrates a second constriction 55b arranged at a second bent side portion 51b corresponding to a second side 50b of the pentagon shape pnt (see FIG. 5). The airbag 10 of the embodiment may enhance the durability by distributing or dispersing an intensively-stressed part caused at the peripheral rim portion 33 of each of the bag portions 31, 31 due to filling with air. In other words, the airbag 10 may enhance the durability by inhibiting the peripheral rim portion 33 of the bag portion 31 from being applied with stress intensively due to filling with air.

The bent side portions 51, 51 of the bag portions 31, 31, respectively, are not arranged parallel to each other. The airbag 10 of the embodiment is configured such that the constrictions 55 of the bent side portions 51 are not aligned in a linear manner, and the shape of the bag portion 31, 31 of the airbag 10 of the embodiment does not largely change from the pentagon shape pnt which is formed before being filled with air.

The aforementioned embodiment may be modified as follows.

In the aforementioned embodiment, the peripheral rim shape α of the bag portion 31 includes the pentagon shape pnt when seen in the thickness direction of the sheet member 30. Alternatively, the peripheral rim shape a of the bag portion 31 may include a polygonal shape other than the pentagon shape. That is, the peripheral rim shape α may be formed in a triangle shape, a quadrilateral shape or a polygonal shape including more than six angles (hexagon). The peripheral rim shape α does not have to include the polygonal shape, and may include the peripheral rim portion 33 which is formed in an arc shape, as long as the peripheral rim portion 33 includes the plural bent side portions 51.

However, it is favorable that the bent side portions 51 are separately arranged over the whole periphery of the peripheral rim portion 33 when considering the distribution of the intensively-stressed part at the time of the inflation of the airbag 10, in other words, when considering the prevention of the intensive application of stress to the peripheral rim portion 33 at the time of the inflation of the airbag 10. It is favorable that the number of angle is five to nine in a case where the bent side portions 51 are arranged to correspond to the side 50a which includes the polygonal shape. That is, when considering the distribution of the intensively-stressed part, it is favorable that the five or more bent side portions 51 are provided. When considering the control of forming the constriction 55 by setting the bent side portion 51, and the increase of the manufacturing cost, it is favorable that the number of angle is nine or less.

In the aforementioned embodiment, the airbag 10 includes the pair of bag portions 31, 31 and the connection portion 32 communicating the bag portions 31, 31. Alternatively, the number of bag portions 31, 31 may be freely changed. The shape of the connection portion 32 communicating the bag portions 31 may be freely changed.

Figure 9:
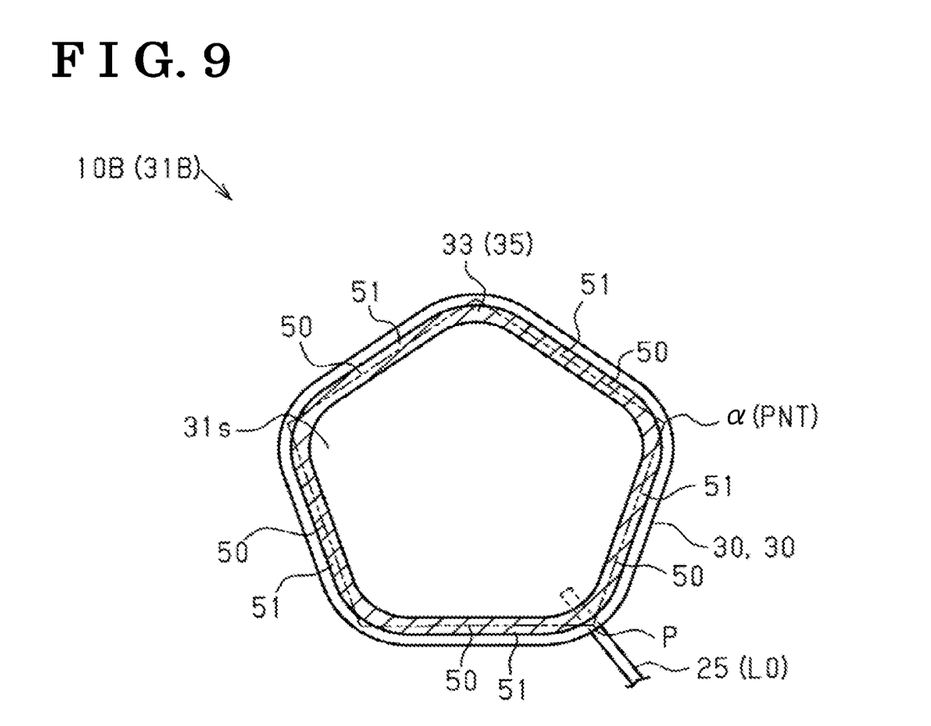
FIG. 9 is a plan view of an airbag of another example.

As shown in FIG. 9, the peripheral rim shape α of a bag portion 31B of an airbag 10B may include an equilateral polygonal shape or a regular polygonal shape. Specifically, the peripheral rim shape α of the bag portion 31B of the airbag 10B includes a regular pentagonal shape PNT. The airbag 10B includes an air tube 25 serving as the intake exhaust flow path Lo at a peak point P of the regular pentagonal shape PNT arranged at the bag portion 31.

In the aforementioned embodiment, the stress may be further effectively distributed to the bent side portions 51, the stress applied to the peripheral rim portion 33 of the bag portion 31B due to filling with air. Specifically, the odd number of the angle of the equilateral polygonal shape helps the bent side portions 51 not being arranged at positions parallel to each other. Accordingly, the shape of the bag portion 31B which inflates may not largely change from the peripheral rim shape α of a bag portion 31B before inflation, and the stress may be effectively distributed.

The material, shape, and attaching method of the sheet member 30 of the airbag 10 may be freely changed.

The aforementioned embodiment describes the airbag 10 for refreshment. Alternatively, the aforementioned disclosure may be applied to airbags for seat support, the airbags changing the support shape of the sheet 1 by inflating and deflating inside the seat surface 1x. Further alternatively, the aforementioned disclosure may be applied to airbags used in other than the seat for the vehicle.

Technical thoughts considered by the aforementioned embodiment and the modified example will hereunder be described.

An airbag formed in a polygonal shape having five to nine angles.

An airbag including an equilateral polygonal shape or a regular polygonal shape.

An airbag formed in a polygonal shape with an odd number of angles.

According to the aforementioned configurations, the stress may be effectively distributed to enhance the durability of the airbag.

Next, the effect and advantage of the embodiment will hereunder be explained.

According to the aforementioned embodiment, the airbag 10, 10b, 10c, 10B includes the bag portion 31, 31B including the two sheet members 30, 30 which are attached to each other. The bag portion 31, 31B provided with the sheet members 30, 30 which are attached to each other includes the peripheral rim portion 33 having the plural bent side portions 51, the bent side portions 51 which each is bent by filling with air inside the bag portion, the bent side portions 51 which each is formed with the groove-shaped constriction at the surface of the bag portion 31, 31B which is configured to inflate by filling with air.

According to the aforementioned configuration, the intensively-stressed part caused at the peripheral rim portion 33 of the bag portion 31, 31B due to filling with air may be distributed at the plural bent side portions 51 arranged at the bag portion 31, 31B. In other words, the peripheral rim portion 33 may be inhibited from being applied with stress intensively due to filling with air, and the stress may be distributed to the plural bent side portions 51. Accordingly, the airbag 10, 10b, 10c, 10B may enhance the durability thereof.

According to the aforementioned embodiment, the peripheral rim portion 33 of the bag portion 31, 31B includes the polygonal shape when seen in the thickness direction of the sheet member 30.

According to the aforementioned configuration, the bent side portion 51 is arranged at the part corresponding to the side 50 of the pentagon shape pnt, the side 50 arranged at the peripheral rim portion 33 of the bag portion 31, 31B. Accordingly, the peripheral rim portion 33 may be effectively inhibited from being applied with stress intensively due to filling with air, and the stress may be distributed to the plural bent side portions 51.

According to the aforementioned embodiment, the airbag further includes the bag portion including the plural bag portions 31, 31B and the connection portion 32 communicating the bag portions 31, 31B. The connection portion 32 communicates the bag portions 31, 31B at the peak point P of the polygonal shape.

According to the aforementioned configuration, the connection portion 32 may not prevent the bent side portion 51 arranged at the bag portion 31, 31B from being bent. Accordingly, the peripheral rim portion 33 may be effectively inhibited from being applied with stress intensively due to filling with air, and the stress may be distributed to the plural bent side portions 51.

According to the aforementioned embodiment, the plural bent side portions 51 are not arranged in parallel to each other.

According to the aforementioned configuration, the constriction 55 (the first constriction 55a, the second construction 55b) of the bent side portion 51 may not be aligned in a linear manner. Accordingly, Accordingly, the peripheral rim portion 33 may be effectively inhibited from being applied with stress intensively due to filling with air, and the stress may be distributed to the plural bent side portions 51. In addition, the shape of the bag portion 31, 31B which is inflated may not largely change from the peripheral rim shape a which is formed before the airbag 10 is filled with air, that is, pentagon shape pnt.

According to the aforementioned embodiment, the seat apparatus for the vehicle further includes a refreshment function pressing the seat surface 1x from inside thereof by inflating and deflating the bag portion 31, 31B.

That is, the airbag 10 for refreshment in which the bag portion 31, 31B often inflates and deflates may easily be degraded or deteriorated by being applied with stress when inflating. Accordingly, further significant effect may be obtained by applying the configurations described above to the airbag 10 for refreshment.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An airbag, comprising:
   a bag portion including two sheet members which are attached to each other,
   wherein the bag portion provided with the sheet members which are attached to each other includes a peripheral rim portion having a plurality of bent side portions, the bend side portions which each is bent by filling with air inside the bag portion, each of the bent side portions includes a groove-shaped constriction at a surface of the bag portion, the groove-shaped constriction extends along the bag portion in a direction of the respective side portion and which is configured to inflate by filling with air.

2. The airbag according to claim 1, wherein the peripheral rim portion of the bag portion includes a polygonal shape when seen in a thickness direction of the sheet member.

3. The airbag according to claim 2, further comprising
   the bag portion includes a plurality of bag portions; and
   a connection portion communicating the bag portions, wherein
   the connection portion communicates the bag portions at a peak point of the polygonal shape.

4. The airbag according to claim 1, wherein the plurality of bent side portions are not arranged in parallel to each other.

5. The airbag according to claim 2, wherein the polygonal shape includes five to nine angles.

6. The airbag according to claim 2, wherein the polygonal shape includes an equilateral polygonal shape.

7. The airbag according to claim 2, wherein a number of angles of the polygonal shape is an odd number.

8. The airbag according to claim 1, wherein the groove-shaped constriction at a surface of the bag portion extends in a direction orthogonal to the respective side portion and is configured to inflate by filling with air.

9. A seat apparatus for a vehicle, the seat apparatus comprising:
   an airbag including a bag portion having two sheet members which are attached to each other,
   wherein the bag portion provided with the sheet members which are attached to each other includes a peripheral rim portion having a plurality of bent side portions, the bent side portions which each is bent by filling with air inside the bag portion, each of the bent side portions includes a groove-shaped constriction at a surface of the bag portion, the groove-shaped constriction extends along the bag portion in a direction of the respective side portion and which is configured to inflate by filling with air, and
   wherein the airbag is arranged inside a seat surface.

10. The seat apparatus for the vehicle according to claim 9, further includes a refreshment function pressing the seat surface from inside thereof by inflating and deflating the bag portion.

11. The seat apparatus for the vehicle according to claim 10, wherein the groove-shaped constriction at a surface of the bag portion extends in a direction orthogonal to the respective side portion and is configured to inflate by filling with air.

* * * * *